US012606154B2

(12) United States Patent
Baumgartner et al.

(10) Patent No.: US 12,606,154 B2
(45) Date of Patent: Apr. 21, 2026

(54) METHOD FOR OPERATING A MOTOR VEHICLE, AND MOTOR VEHICLE

(71) Applicant: Bayerische Motoren Werke Aktiengesellschaft, Munich (DE)

(72) Inventors: Laura Baumgartner, Schwabhausen (DE); Christoph Reichmann, Dachau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 207 days.

(21) Appl. No.: 18/028,168

(22) PCT Filed: Sep. 29, 2021

(86) PCT No.: PCT/EP2021/076720
§ 371 (c)(1),
(2) Date: Mar. 23, 2023

(87) PCT Pub. No.: WO2022/096197
PCT Pub. Date: May 12, 2022

(65) Prior Publication Data
US 2023/0406283 A1      Dec. 21, 2023

(30) Foreign Application Priority Data
Nov. 5, 2020    (DE) ..................... 10 2020 129 143.4

(51) Int. Cl.
*B60W 20/15*         (2016.01)
*B60K 6/46*          (2007.10)
(Continued)

(52) U.S. Cl.
CPC .............. *B60W 20/15* (2016.01); *B60K 6/46* (2013.01); *B60K 6/485* (2013.01); *B60W 10/06* (2013.01);
(Continued)

(58) Field of Classification Search
CPC ...... B60W 20/15; B60W 10/06; B60W 10/08; B60W 20/10; B60K 6/46; B60K 6/485;
(Continued)

(56) References Cited

U.S. PATENT DOCUMENTS 3,508,530 A      4/1970   Clawson
11,085,402 B1 *  8/2021   Vroman ................. F02M 23/04
(Continued)

FOREIGN PATENT DOCUMENTS

CN          103620198 A      3/2014
CN          108291476 A      7/2018
(Continued)

OTHER PUBLICATIONS

International Search Report (PCT/ISA/210) issued in PCT Application No. PCT/EP2021/076720 dated Jan. 17, 2022 with English translation (four (4) pages).
(Continued)

*Primary Examiner* — Brandon D Lee
(74) *Attorney, Agent, or Firm* — Crowell & Moring LLP

(57) ABSTRACT

The present disclosure is directed to operation of a motor vehicle including a first motor configured as an internal combustion engine and a second motor configured as an electric motor. The first motor comprises a combustion chamber, an ignition source and a prechamber that is coupled fluidically to the combustion chamber and into which a portion of the ignition source is introduced. The first motor can be operated by ignition of a fuel/air mixture in the prechamber interior by the ignition source. By way of a control device, the first motor is activated in a manner dependent on a load requirement, and is operated by ignition of the fuel/air mixture in the prechamber interior by the at least one ignition source only when it is operated exclusively in a stable combustion state as a result.

16 Claims, 2 Drawing Sheets

(51) Int. Cl.

| | |
|---|---|
| *B60K 6/485* | (2007.10) |
| *B60W 10/06* | (2006.01) |
| *B60W 10/08* | (2006.01) |
| *F02B 19/12* | (2006.01) |

(52) U.S. Cl.

CPC ............. *B60W 10/08* (2013.01); *F02B 19/12* (2013.01); *B60Y 2200/92* (2013.01)

(58) Field of Classification Search

CPC . B60K 6/44; F02B 19/12; F02B 19/10; B60Y 2200/92; Y02T 10/12; F02D 37/02; F02D 41/2409; F02D 2200/1002; F02D 2200/503; F02P 15/02; F02P 13/00

See application file for complete search history.

(56) References Cited

U.S. PATENT DOCUMENTS

| | | | | |
|---|---|---|---|---|
| 2007/0221164 | A1* | 9/2007 | Ashida | F02B 19/12 |
| | | | | 123/267 |
| 2013/0085633 | A1 | 4/2013 | Ohno | |
| 2014/0095050 | A1 | 4/2014 | Dieler et al. | |
| 2014/0364273 | A1 | 12/2014 | Martin | |
| 2015/0112523 | A1* | 4/2015 | Wang | B60W 10/02 |
| | | | | 180/65.265 |
| 2018/0244143 | A1* | 8/2018 | Gollmer | B60K 6/365 |
| 2019/0031177 | A1* | 1/2019 | Ruebsam | B60W 10/188 |
| 2019/0078498 | A1 | 3/2019 | Bedogni et al. | |
| 2020/0309083 | A1* | 10/2020 | O'Connor | F02P 5/1506 |
| 2022/0049661 | A1* | 2/2022 | Schroeder | F02D 41/0082 |
| 2023/0347872 | A1* | 11/2023 | Gesang | B60L 7/18 |

FOREIGN PATENT DOCUMENTS

| | | | |
|---|---|---|---|
| CN | 111771051 | A | 10/2020 |
| DE | 1926474 | A | 1/1970 |
| DE | 10 2014 210 563 | A1 | 12/2014 |
| DE | 10 2017 009 235 | A1 | 4/2019 |
| DE | 10 2020 110 960 | A1 | 10/2020 |
| DE | 10 2019 116 192 | A1 | 12/2020 |
| DE | 10 2019 214 703 | A1 | 3/2021 |
| EP | 3 561 255 | A1 | 10/2019 |
| WO | WO 2019/125430 | A1 | 6/2019 |

OTHER PUBLICATIONS

German-language Written Opinion (PCT/ISA/237) issued in PCT Application No. PCT/EP2021/076720 dated Jan. 17, 2022 (six (6) pages).

German-language Search Report issued in German Application No. 10 2020 129 143.4 dated Jul. 6, 2021 with partial English translation (11 pages).

Sens, M. et al., "Vorkammerzündung als Schlüsseltechnologie für einen zukünftigen Antriebsstrang-Mix", In: MTZ-Motortechnische Zeitschrift, Jan. 11, 2019, 80, pp. 46-53 (eight (8) pages).

Chinese-language Office Action issued in Chinese Application No. 202180061823.3 dated Mar. 27, 2025, with English translation (15 pages).

\* cited by examiner

METHOD FOR OPERATING A MOTOR VEHICLE, AND MOTOR VEHICLE

BACKGROUND AND SUMMARY

The present disclosure concerns a method for operating a motor vehicle which comprises at least two motors, of which at least one first motor is configured as an internal combustion engine and at least one second motor, designed to drive the motor vehicle, is configured as an electric motor. To control the at least two motors, at least one control device is used. A further aspect concerns a motor vehicle.

To comply with emission limits, which are established by ever more stringent emissions legislation for both pollutants and for carbon dioxide emissions, hybrid vehicles have become established, which allow an at least locally emission-free driving. For example, publication DE 10 2014 210 563 A1 discloses a method in which a fuel-burning internal combustion engine and a motor configured as an electric motor are used to drive the vehicle, which is configured as a hybrid electric vehicle.

An object of the present invention is to provide a method and a motor vehicle of the type cited initially with which particularly energy-saving driving is possible.

This object is achieved by a method with the features as disclosed herein, and by a motor vehicle with the features also as disclosed herein. Advantageous embodiments and suitable refinements of the invention are also disclosed herein.

A first aspect of the invention concerns a method for operating a motor vehicle which comprises at least two motors, of which at least one first motor is configured as an internal combustion engine and at least one second motor, designed to drive the motor vehicle, is configured as an electric motor, wherein at least one control device is used to control the at least two motors. The second motor, configured as an electric motor, can thus drive the vehicle electrically, i.e. by electromotor operation of the second motor, and thereby allow driving of the motor vehicle.

According to the invention, it is provided that the at least one first motor comprises at least one combustion chamber, at least one ignition source and at least one prechamber which has a prechamber interior fluidically coupled to the at least one combustion chamber, and into which the at least one ignition source is introduced at least in regions, wherein the at least one first motor can be operated by combustion of a fuel-air mixture in the prechamber interior by means of the at least one ignition source in a stable firing state and in an unstable firing state, wherein the at least one first motor is activated by the control device, in particular exclusively, depending on a load requirement, and is operated by ignition of the fuel-air mixture in the prechamber interior by means of the at least one ignition source only when the first motor is thereby operated exclusively in the stable firing state in order to fulfil the load requirement. This is advantageous since the first motor is thereby operated in targeted fashion, in particular exclusively, in the stable firing state, i.e. in other words, operation of the first motor in unstable firing state can be avoided. In other words, operation of the first motor in unstable firing state can be completely omitted.

The expression that "the first motor is operated exclusively in the stable firing state in order to fulfil the load requirement" may be understood to mean that power is provided by the first motor, in particular exclusively provided, when the first motor can be operated, in particular exclusively, in the stable firing state in order to provide the power. This power provided by the first motor, which may also be called the first power, may be used for example to drive vehicle components e.g. pumps, or for their energy supply, to name just a few examples.

The first motor may be configured additionally or alternatively to drive the motor vehicle. The first motor configured as an internal combustion engine can thus drive the motor vehicle by internal combustion, i.e. by operation of the first motor as an internal combustion engine, and thereby allow driving of the motor vehicle. It is also conceivable that the first motor and second motor are operated simultaneously, whereby the motor vehicle can be driven simultaneously electrically and by the internal combustion engine.

The prechamber interior and the combustion chamber may thereby be fluidically, i.e. fluid-conductively, coupled together in that the prechamber has at least one passage opening, preferably a plurality of passage openings, via which the prechamber interior and the combustion chamber can be connected together.

The ignition source may preferably be configured as a spark plug. The spark plug is firstly particularly robust and secondly allows a particularly reliable output of ignition energy in the form of at least one ignition spark.

The invention is based on the knowledge that operation of the first motor (internal combustion engine) in the stable firing state and in the unstable firing state is in particular load-dependent. In other words, whether the first motor can be operated in the stable firing state or unstable firing state depends on the load. In addition, the invention is based on the knowledge that the risk that the first motor will be operated in the unstable firing state is particularly high immediately after a cold start for example, i.e. before reaching a respective operating temperature of the operating media concerned, which includes for example engine oil and coolant of the first motor. The further the temperatures of the respective operating media lie below the operating temperatures concerned, the greater for example the cooling of so-called torch jets which pass from the prechamber interior to the combustion chamber, after ignition of the fuel-air mixture in the prechamber interior by means of the at least one ignition source. The cooling of these torch jets hinders the ignition of fuel contained in the combustion chamber (by means of the torch jets), so that so-called misfires can occur which may characterize the unstable firing state. These misfires may lead to undesirable absence of ignition of fuel in the combustion chamber despite the supply of ignition energy to the fuel-air mixture.

The invention here assumes that, with the present method, the control device can perform an assessment of whether the first motor can be operated exclusively in the stable firing state. For this assessment, as well as the load requirement, for example the temperatures of the respective operating media may be used. If the temperatures of the operating media lie below the operating temperature, there is a risk of operation of the first motor in the unstable firing state caused by cold start, insofar as simultaneously the load requirement being too low, so that, for example, misfires occur. When the operating temperatures have been reached, the first motor is in the so-called warm-running state.

In contrast to the stable firing state, in the unstable firing state, running is generally irregular; in particular, there are more running irregularities when the first motor is operated as an internal combustion engine.

The load requirement may be based on a load demand from a driver of the motor vehicle. The load demand may be transmitted to the control device by actuation of an accelerator pedal of the motor vehicle, and the first motor may be activated based on the load demand. Accordingly, the first motor may generate a torque dependent on load demand. In addition or alternatively, the load requirement may be established independently of the driver's load demand, for example based on a nominal exhaust gas temperature which the exhaust gas emitted by the first motor must have in order to allow rapid heating of an exhaust gas aftertreatment device, in particular a catalytic converter, of the first vehicle or first motor.

At idle, both in warm state and on cold start of the first motor, the unstable firing state may prevail for example at a proportion of misfires of more than 1% and hence simultaneously less than or equal to 99% successful ignitions (during fired operation of the first motor by ignition of the fuel-air mixture in the prechamber interior by means of the at least one ignition source). Accordingly, the stable firing state (at idle, both when warm and also on cold start) may prevail at a proportion of less than 1% misfires.

The load requirement may also be set in order to ensure rapid heating of the exhaust gas aftertreatment device, e.g. a catalytic converter of the motor vehicle. Here, the unstable firing state may prevail at a value of more than 20% CV relative to an indicated mean pressure which occurs in the combustion chamber on fired operation of the first motor, whereas the stable firing state may prevail at a value of less than or equal to 20% CV. The abbreviation CV stands for a coefficient of variation relative to the indicated mean pressure.

In general, the unstable firing state may prevail when at least one misfire occurs in 500 successive combustion cycles, preferably at least one misfire per 1000 successive combustion cycles, i.e. at a high-pressure proportion of the indicated mean pressure ($p_{mi,HD}$), whereas the stable firing state may prevail at a correspondingly lower proportion of misfires during successive combustion cycles.

In an advantageous refinement of the invention, an electrical energy store, in particular a high-voltage battery, of the motor vehicle, which is configured to provide electrical energy for the second motor, is supplied with energy generated during operation of the first motor at least in the stable firing state, at least when a predefined charge state of the electrical energy store is not reached. This is advantageous since the first motor, when operated in the stable firing state, can thus be used to charge the energy store, whereby a range increase can be achieved for driving the motor vehicle using the second motor.

In the stable firing state, the energy can also be provided by a crankshaft of the first motor. The crankshaft may for example drive an alternator of the motor vehicle coupled to the energy store, whereby the energy store can be charged, i.e. supplied with electrical energy provided by the alternator. Thus the power provided by the first motor can be at least partially used for charging the energy store. It is also conceivable that the second motor is operated as a generator and accordingly the energy store is charged by the second motor. In other words, the second motor may be operated as a so-called motor-generator, i.e. an electrical machine which can be used alternately either as electric drive or as an electric generator.

The energy store may for example be a traction battery, also known as a high-voltage battery, of the motor vehicle.

In a further advantageous refinement of the invention, the at least one first motor is operated by ignition of fuel by means of a second ignition source of the first motor protruding directly into the combustion chamber, and the motor vehicle is driven by means of the first motor, at least when the driving of the motor vehicle by the second motor is excluded and the load requirement suggests that operation of the at least one first motor by ignition of the fuel-air mixture in the prechamber interior by means of the at least one ignition source would lead to the unstable firing state. This is advantageous since the second ignition source may thus be used to operate the first motor by ignition of fuel when the too-low load requirement, for example, would lead to the first motor operating in the unstable firing state by ignition of the fuel-air mixture in the prechamber interior by means of the ignition source. The ignition source and the second ignition source may thus be used for ignition at different values of the load requirement, i.e. in other words at different load values, so that the first motor can be operated over its entire load map in particular without misfires.

The fuel may also be ignited using the second ignition source to achieve the rapid heating of the exhaust gas aftertreatment device. The control device, which may generally be configured as a control unit, in particular an engine control unit, may, for rapid heating, in particular set late combustion mass burn points of e.g. 70-80 degrees crank angle (° CA) after top dead center, which may also be known as ignition TDC.

The driving of the motor vehicle by the second motor may for example be excluded if insufficient electrical energy is available for driving the second motor. This may occur for example in a critical charge state of the energy store, in which driving the motor vehicle by means of the second motor can be excluded.

In a further advantageous refinement of the invention, the prechamber is operated as a passive prechamber at least in a full-load operation of the at least one first motor. This is advantageous since operation with the passive prechamber ensures a particularly high knock resistance of the first motor and hence reliable avoidance of detonation.

When the prechamber is operated as a passive prechamber, the fuel-air mixture may pass from the at least one combustion chamber into the prechamber interior, which is fluidically (fluid-conductively or fluid-exchangeably) coupled to the combustion chamber, where it is ignited by the ignition source. When the prechamber is configured as a passive prechamber, the prechamber and the ignition source may be arranged particularly compactly, preferably on a cylinder head of the first motor.

The at least one first motor may comprise an injection device by means of which fuel may be introduced directly, i.e. by direct injection into the combustion chamber, and/or indirectly into the combustion chamber. The fuel may be indirectly introduced into the combustion chamber for example by introduction of the fuel into an intake tract of the first motor. The fuel can then be conducted into the combustion chamber from the intake tract via open inlet valves.

In a further advantageous refinement of the invention, the prechamber is operated as an active prechamber at least in a part-load operation of the at least one first motor. This can advantageously cause a reliable ignition even with a lean global combustion air ratio ($\lambda > 1$), whereby a particularly fuel-saving operation of the first motor is possible. To operate the prechamber as an active prechamber, the at least one first motor may have a prechamber injection device, by means of which fuel and—also or alternatively—air, for example an air-fuel mixture, can be introduced directly into the prechamber interior. Thus a particularly reliable ignition of the fuel-air mixture thereby formed inside the prechamber interior can be achieved.

In a further advantageous refinement of the invention, the unstable firing state is assigned to a low-load range between 0% and maximum 10% of a maximum load of the at least one first motor. In other words, the low-load operating range preferably extends between 0% and maximum 10% of the maximum load of the first motor. Accordingly, preferably in this low-load range, the unstable firing state is omitted. The first motor, insofar as it would operate in the low-load range by ignition of the fuel-air mixture in the prechamber interior by means of the ignition source, would run in the unstable firing state. Accordingly, by ignition of the fuel-air mixture in the prechamber interior by means of the at least one ignition source, the first motor is preferably operated in a load range differing from the low-load range, in particular the characteristic map range. On operation at maximum load, the first motor may produce a so-called nominal moment, i.e. a maximum torque which can be generated by the first motor at its crankshaft.

The low-load range may lie at an indicated mean pressure $(p_{mi})$ of less than 2 bar, i.e. for example $p_{mi}$=1.95 bar or less. Values of the indicated mean pressure greater than or equal to 2 bar, e.g. 2.05 bar, may be assigned to the load range different from the low-load range. In the warm-running state, the unstable firing state may prevail in the low-load range at a value of greater than or equal to 4% CV (relative to the indicated mean pressure), whereas the stable firing state may prevail at a value of less than 4% CV. On cold start, the unstable firing state may prevail in the low-load range e.g. at a proportion of misfires of more than 1%, and hence simultaneously less than or equal to 99% successful ignitions (during fired operation of the first motor by ignition of the air-fuel mixture in the prechamber interior by means of the at least one ignition source).

A second aspect of the invention concerns a motor vehicle with at least two motors, of which at least one first motor is configured as an internal combustion engine and at least one second motor, designed to drive the motor vehicle, is configured as an electric motor, and with at least one control device which is configured to control the at least two motors. According to the invention, it is provided that the at least one first motor comprises at least one combustion chamber, at least one ignition source and at least one prechamber which has a prechamber interior fluidically coupled to the at least one combustion chamber, and into which the at least one ignition source is introduced at least in regions, wherein the at least one first motor can be operated by ignition of a fuel-air mixture in the prechamber interior by means of the at least one ignition source in a stable firing state and in an unstable firing state, and wherein the control device is configured to activate the at least one first motor depending on a load requirement and control this such that the at least one first motor is operated by ignition of the fuel-air mixture in the prechamber interior by means of the at least one ignition source only when the first motor can be operated exclusively in the stable firing state in order to fulfil the load requirement. In this motor vehicle, a particularly energy-saving driving operation is possible, i.e. operation at which the motor vehicle is driven and powered by motor.

In an advantageous refinement of the invention, the motor vehicle comprises a serial hybrid drivetrain to which the at least two motors are assigned. This is advantageous since the first motor may here be used exclusively to provide power for operation of the second motor. Thus the first motor may be used particularly flexibly so that operation of the first motor in the stable firing state can be ensured particularly easily.

In an advantageous refinement of the invention, the motor vehicle comprises a parallel hybrid drivetrain to which the at least two motors are assigned. This is advantageous since, in this way, both the first motor and the second motor can be used to drive the motor vehicle, whereby a particularly powerful acceleration of the motor vehicle is possible when required.

In an advantageous refinement of the invention, the motor vehicle comprises a power-branched hybrid drivetrain to which the at least two motors are assigned. This advantageously allows a particularly flexible setting of the different driving states of the motor vehicle.

The preferred embodiments and their advantages presented in relation to one of the aspects apply accordingly to the other aspect of the invention, and vice versa.

The features and feature combinations cited in the description above, and the features and feature combinations cited in the description of the figures which follows and/or shown solely in the figures, can be used not only in the respective combination given but also in other combinations or alone without leaving the scope of the invention.

Further advantages, features and details of the invention arise from the claims, the following description of preferred embodiments, and the drawings.

The invention is now explained again below with reference to a concrete exemplary embodiment.

DETAILED DESCRIPTION

Figure 1:
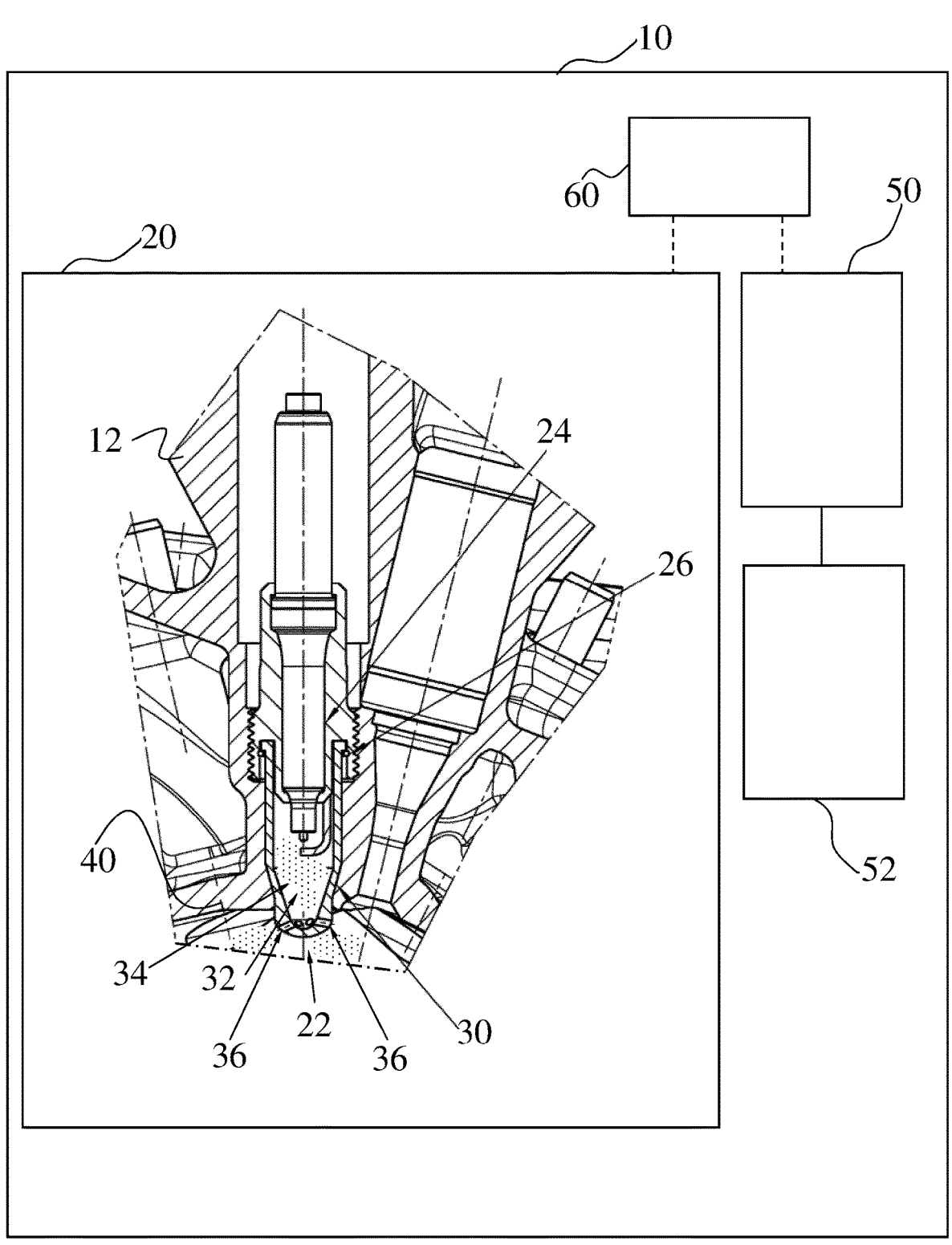
FIG. 1 shows an abstract illustration of a motor vehicle comprising two equally abstractly shown motors for driving the motor vehicle, wherein a first motor, shown in regions in schematic sectional illustration, of the two motors is configured as an internal combustion engine, and a second motor of the motors as an electric motor, and the first motor has at least one combustion chamber, at least one ignition source and at least one prechamber which has a prechamber interior fluidically coupled to the at least one combustion chamber and in which at least one ignition source is introduced at least in regions in order to ignite a fuel-air mixture in the prechamber interior.

FIG. 1 shows in a schematic illustration a motor vehicle 10 which comprises two motors 20, 50. A first motor 20 of these two motors 20, 50 is here configured as an internal combustion engine. A second motor 50 of the two motors 20, 50 is configured as an electric motor in this case. In the present case, the motor vehicle 10 can be driven with each of the motors 20, 50. In other words, the motors 20, 50 can each generate drive power, in particular independently of one another, and use this power to drive the drive wheels (not shown here) of the motor vehicle 10. The motor vehicle 10 may thereby for example be driven and hence moved purely by the combustion engine and/or purely electrically.

It is clear that the motor vehicle 10 may also comprise for example several second motors 50, by means of which the motor vehicle 10 can be driven. For example, it is conceivable that a respective second motor 50, which may e.g. be configured as a wheel hub motor, may be assigned to each wheel of an axle of the motor vehicle 10, to name just one example.

The motors 20, 50 may be actuated, i.e. regulated and operated in controlled fashion, by means of a control device 60 of the motor vehicle 10 which is coupled for signaling purposes to each of the motors 20, 50. The at least one second motor 50 may e.g. be designed as a motor generator. Independently thereof, the motors 20, 50 may be mechanically coupled together, or be able to be mechanically coupled together by a clutch device of the motor vehicle 10 (not shown in the present case). The motor vehicle 10 comprises an energy store 52, which may for example be configured as a high-voltage battery or traction battery. The at least one second motor 50 can be supplied with electrical energy by the energy source 20.

The motor vehicle 10 may for example comprise a serial hybrid drivetrain or a parallel hybrid drivetrain to which the motors 20, 50 may be assigned. Alternatively, the motor vehicle 10 may comprise a power-branched hybrid drivetrain to which the motors 20, 50 may be assigned. To summarize, various operating strategies of the motors 20, 50 are thus conceivable.

FIG. 1 also shows, in schematic sectional illustration, an extract of the first motor 20 configured as an internal combustion engine. In this extract, a part region of a cylinder head 12 of the first motor 20 can be seen. An ignition source 24, in the present case designed as a spark plug, is arranged on the cylinder head 12. One end of the ignition source 24 is introduced into a prechamber interior 32 of a prechamber 30 of the first motor 20. Ignition energy, for example in the form of an ignition spark, may be released at this end in order to ignite and thereby burn a fuel-air mixture 34 present in the prechamber interior 32. In the present case, the ignition source 24 and prechamber 30 are connected together via a fixing element 26, which may for example be configured as a locking ring. It is also evident from FIG. 1 that the prechamber 30 comprises several passage openings 36, via which the prechamber interior 32 is fluidically, in particular gas-conductively, connected to a combustion chamber 22 of the first motor 20.

Figure 2:
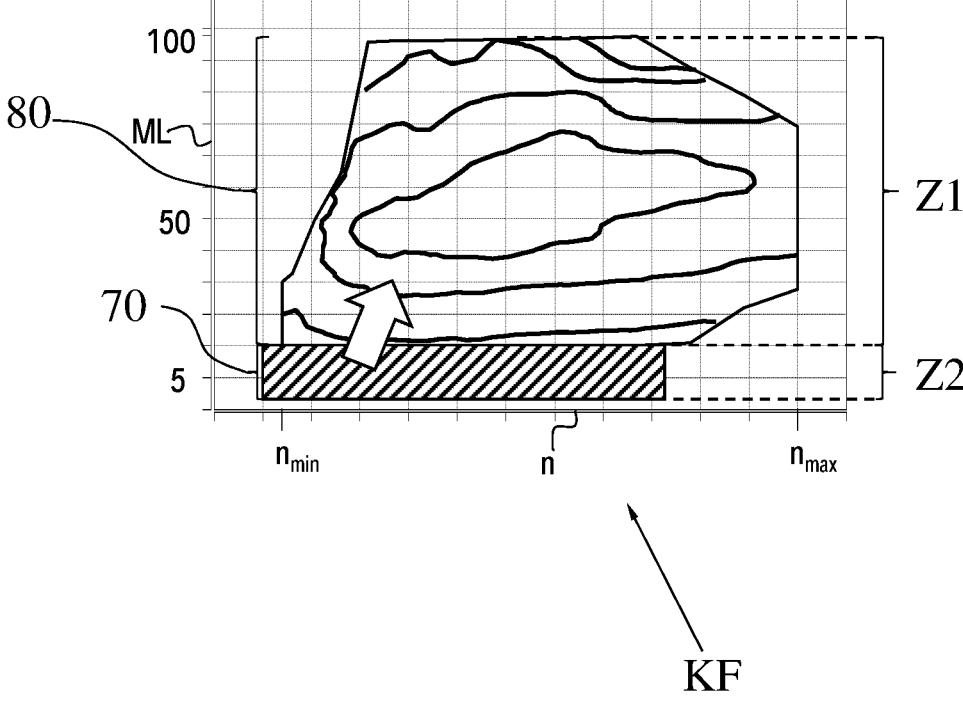
FIG. 2 shows a qualitative depiction of a characteristic map, which may also be called a load map, having a low-load range in which the first motor can be operated in an unstable firing state on ignition of the fuel-air mixture in the prechamber interior by means of the at least one ignition source, and which shows a load range different from the low-load range in which the first motor can be operated in a stable firing state on ignition of the fuel-air mixture in the prechamber interior by means of the least one ignition source.

By ignition of the fuel-air mixture 34 in the prechamber interior 32 by means of the at least one ignition source 24, the first motor 20 may be operated in a stable firing state Z1 and in an unstable firing state Z2. The stable firing state Z1 and the unstable firing state Z2 are assigned to different load ranges 70, 80, namely a low-load range 70 and a load range 80 different from the low-load range 70, which are shown schematically in a characteristic map KF shown in FIG. 2. The stable firing state Z1 is assigned to the load range 80 and the unstable firing state Z2 to the low-load range 70. In this case, an engine load ML is shown on an ordinate of the map KF as a percentage (%) of a full load of the first motor 20, while a rotation speed n, with the unit "revolutions per minute", is shown on an abscissa of the map KF. The full load may also be called the maximum load. The full load of the first motor 20 corresponds to a value of 100%. In addition, a minimum rotation speed $n_{min}$, which may be called the idle rotation speed of the first motor 20, and a maximum rotation speed $n_{max}$ of the first motor 20 are shown qualitatively on the abscissa.

The first motor 20 is activated by the control device 60 depending on a load requirement, and operated by ignition of the fuel-air mixture 34 in the prechamber interior 32 by means of the ignition source 24, only when thereby the first motor 20 can be operated exclusively in the stable firing state Z1 in order to fulfil the load requirement.

The first motor 20 may be operated in the stable firing state Z1 by the air-fuel mixture 34 being ignited in the prechamber interior 32 by means of the ignition source 34, and as a result of ignition, torch jets enter the combustion chamber 22 via the passage openings 36. The torch jets (not shown) may then ignite fuel present in the combustion chamber 22 and thus burn this, causing the movement of a piston (not shown in detail) which at least partially delimits the combustion chamber 22 of the first motor 20, and hence a crankshaft (also not shown in detail) coupled to the piston of the first motor 20 can be driven.

The electrical energy store 52, configured to provide electrical energy for the second motor 50 (here a high-voltage battery or traction battery), of the motor vehicle 10 is supplied with energy generated in operation of the first motor 20 in the stable firing state Z1 at least when a predefined charging state of the electrical energy store 52 is not reached. The charging state of the electrical energy store 52 may also be abbreviated to SOC (state of charge).

The first motor 20 can then be operated by ignition of the fuel by means of a second ignition source 40 protruding directly into the combustion chamber 22 of the first motor 20, and the motor vehicle 10 driven by means of the first motor 20, at least when driving of the motor vehicle 10 by the second motor 50 is excluded and the load requirement suggests that the unstable firing state Z2 would prevail on operation of the first motor 20 by ignition of the fuel-air mixture 34 in the prechamber interior 32 by means of the ignition source 24. The second ignition source 40 in this case is also configured as a spark plug. In other words, during operation of the first motor 20 in the low-load range 70, no ignition of the fuel-air mixture 34 takes place using the ignition source 24 and hence inside the prechamber interior 32, in order to avoid the first motor 20 thereby running in the unstable firing state Z2. Instead, the first motor 20 can be operated in the low-load range 70 by ignition of the fuel directly in the combustion chamber 22 using the second ignition source 40. The second ignition source 40 is shown in highly abstract form in FIG. 1 for reasons of clarity, and there illustrated by a dotted line.

The prechamber 30 may be operated as a passive prechamber, at least in operation of the first motor 20 at full load, i.e. in other words, in full load operation of the first motor 20. In a part-load operation of the first motor 20, the prechamber 30 may also be operated as an active prechamber. The part-load operation is assigned to a part-load range which extends between the low-load range 70 illustrated in FIG. 2 and full load. The part-load range may thus correspond to a part of the load range 80 excluding full load. It is evident from FIG. 2 that the unstable firing state Z2 extends over the low-load range 70, which in the present case lies for example exclusively between 0% and maximum 10% of maximum load (100% of motor load ML).

The present method allows the first motor 20 (internal combustion engine) to be operated exclusively in the stable firing state Z1 by so-called prechamber ignition, i.e. by ignition of the fuel-air mixture 34 in the prechamber interior 32 by means of the ignition source 24, wherein by means of the torch jets formed thereby and passing through the passage openings 36 into the combustion chamber 22, the fuel in the combustion chamber 22 is ignited and as a result the piston is moved and the crankshaft driven.

The method is based on the knowledge that stable ignition and combustion by prechamber ignition cannot be reliably and reproducibly guaranteed at very low loads of the first motor 20, i.e. in other words, on operation of the first motor 20 in the low-load range 70, e.g. at idle, and/or with very retarded ignition angles in the low-load range 70. Furthermore, it is based on the knowledge that the prechamber ignition at high loads, i.e. during operation of the internal combustion engine (first motor 20) in the load range 80 and also at full load, offers significant advantages over internal combustion engines without prechamber, in particular in the combustion sequence.

The method with this starting point allows targeted operation of the first motor 20 with prechamber ignition in hybrid vehicle drive, i.e. with serial, parallel or power-branched hybrid drivetrain. Operation of the first motor 20 in the low-load range 70 with prechamber ignition in the unstable firing state Z2 can be suppressed, or in other words avoided, in targeted fashion. For example, operation of the first motor 20 in the low-load range 70 may be omitted completely if the charge state of the electrical energy store 52 is sufficient to power the motor vehicle 10 exclusively using the (at least one) second motor 50 and hence purely electrically. If the predefined charging state is not reached, which is the case for example with a discharged (empty) electrical energy store 52, the first motor 20 may for example be accelerated unfired using the second motor 50 or using a starter of the motor vehicle 10, and operated by firing by prechamber ignition directly above the low-load range 70. The first motor 20 can thus effectively be accelerated from a standstill and operated in coasting mode until the stable firing state Z1 is possible with prechamber ignition in the load range 80. Ignition of the fuel-air mixture 34 may then take place directly, in particular exclusively, in the load range 80. Accordingly, the operating point of the first motor 20 may be raised to an operating range outside the low-load range 70, and hence operation of the first motor 20 in the stable firing state Z1 is possible, in order for example to charge the energy store 52 by means of the first motor 20 and—additionally or alternatively—to drive the motor vehicle 10 by means of the first motor 20.

LIST OF REFERENCE SIGNS

10 Motor vehicle
12 Cylinder head
20 First motor
22 Combustion chamber
24 Ignition source
26 Fixing element
30 Prechamber
32 Prechamber interior
34 Fuel-air mixture
36 Passage opening
40 Second ignition source
50 Second motor
52 Energy store
60 Control device
70 Low-load range
80 Load range
KF Characteristic map
ML Motor load
n Rotation speed
$n_{min}$ Minimum rotation speed
$n_{max}$ Maximum rotation speed
Z1 Stable firing state
Z2 Unstable firing state
The invention claimed is:

1. A method for operating a motor vehicle, comprising:
activating a first motor of the motor vehicle by at least one control device depending on a load requirement, wherein the first motor is an internal combustion engine comprising at least one combustion chamber and at least one prechamber with a prechamber interior fluidically coupled to the at least one combustion chamber and into which at least one ignition source is introduced;
operating, by the at least one control device, the first motor such that ignition of a fuel-air mixture in the prechamber interior by the at least one ignition source occurs only when the first motor is operated exclusively in a stable firing state in order to fulfill the load requirement;
accelerating the first motor from standstill by a second motor that is an electric motor;
operating the first motor unfired in a coasting mode until the stable firing state is possible by ignition in a load range; and
upon the stable firing state being possible, initiating ignition of the fuel-air mixture directly in the load range.

2. The method according to claim 1, further comprising:
supplying an electrical energy store of the motor vehicle with energy generated during operation of the first motor at least in the stable firing state, at least when a predefined charge state of the electrical energy store is not reached, wherein the electrical energy store is configured to provide electrical energy for the second motor.

3. The method according to claim 1, further comprising:
operating the first motor by ignition of fuel by a second ignition source of the first motor protruding directly into the combustion chamber,
driving the motor vehicle by the first motor, at least when driving of the motor vehicle by the second motor is excluded and the load requirement indicates that operation of the first motor by ignition of the fuel-air mixture in the prechamber interior by way of the at least one ignition source would lead to the unstable firing state.

4. The method according to claim 1, further comprising:
operating the prechamber as a passive prechamber at least in a full-load operation of the first motor.

5. The method according to claim 1, further comprising:
operating the prechamber as an active prechamber at least in a part-load operation of the first motor.

6. The method according to claim 1, wherein an unstable firing state is assigned to a low-load range between 0% and maximum 10% of a maximum load of the first motor.

7. A motor vehicle comprising:
a first motor configured as an internal combustion engine;
a second motor, configured to drive the motor vehicle and configured as an electric motor; and
at least one control device configured to control the first motor and the second motor;
wherein the first motor comprises:
at least one combustion chamber;
at least one ignition source; and
at least one prechamber which has a prechamber interior fluidically coupled to the at least one combustion chamber, and into which the at least one ignition source is introduced at least in regions,
wherein the first motor is operated by ignition of a fuel-air mixture in the prechamber interior by the at least one ignition source in a stable firing state and in an unstable firing state,
wherein the control device is configured to activate the first motor depending on a load requirement and control the first motor to be operated by ignition of the fuel-air mixture in the prechamber interior by the at least one ignition source only when the first motor operates exclusively in the stable firing state in order to fulfill the load requirement;

wherein the control device is configured to accelerate the first motor from standstill by the second motor and operate the first motor in coasting mode until the stable firing state is possible by the ignition in a load range; and wherein the ignition of the fuel-air mixture takes place directly in the load range.

8. The motor vehicle according to claim 7, wherein:

the first motor and the second motor are operatively connected to a serial hybrid drivetrain.

9. The motor vehicle according to claim 7, wherein:

the first motor and the second motor are operatively connected to a parallel hybrid drivetrain.

10. The motor vehicle according to claim 7, wherein:

the first motor and the second motor are operatively connected to a power-branched hybrid drivetrain.

11. The motor vehicle according to claim 7, further comprising:

an electrical energy store configured to:

provide electrical energy for the second motor; and be supplied with energy generated on operation of the first motor at least in the stable firing state, at least when a predefined charge state of the electrical energy store is not reached.

12. The motor vehicle according to claim 11, wherein the electrical energy store is a high-voltage battery.

13. The motor vehicle according to claim 7, further comprising:

a second ignition source of the first motor protruding directly into the combustion chamber, wherein the first motor is configured to be operated by ignition of fuel by the second ignition source, and wherein the motor vehicle is driven by the first motor, at least when the driving of the motor vehicle by the second motor is excluded and the load requirement indicates that operation of the first by ignition of the fuel-air mixture in the prechamber interior by the at least one ignition source would lead to the unstable firing state.

14. The motor vehicle according to claim 7, wherein the prechamber is configured to be operated as a passive prechamber at least in a full-load operation of the first motor.

15. The motor vehicle according to claim 7, wherein the prechamber is operated as an active prechamber at least in a part-load operation of the first motor.

16. The motor vehicle according to claim 7, wherein the unstable firing state is assigned to a low-load range between 0% and maximum 10% of a maximum load of the first motor.

* * * * *